Inventors:
THOMAS JULIUS REY
ROLF EDMUND SPENCER
BY Ralph E. Atherton
Attorney

Inventors:
THOMAS JULIUS REY
ROLF EDMUND SPENCER
BY Ralph E. Atherton
Attorney

April 23, 1957 T. J. REY ET AL 2,789,760

ELECTRICAL COMPUTING APPARATUS

Filed Jan. 24, 1951 3 Sheets-Sheet 3

Inventors
T. J. Rey
R. E. Spencer
By Glascock Downing & Seebold
Attys

United States Patent Office

2,789,760

Patented Apr. 23, 1957

2,789,760

ELECTRICAL COMPUTING APPARATUS

Thomas Julius Rey, Hayes, and Rolf Edmund Spencer, West Ealing, London, England, assignors to Electric & Musical Industries Limited, Hayes, England, a company of Great Britain

Application January 24, 1951, Serial No. 207,489

Claims priority, application Great Britain February 1, 1950

4 Claims. (Cl. 235—61)

This invention relates to electrical computing apparatus.

Some forms of computing apparatus capable of effecting the multiplication of positive and of negative numbers have already been proposed but, so far, whereas these forms when multiplying positive numbers carry out a straight forward procedure, there are encountered what might be termed irregularities of procedure when one of the numbers or both of the numbers to be multiplied are negative.

The object of the present invention is to provide improved electrical computing apparatus, with the object of avoiding such irregularities of procedure.

According to a known sign convention, used particularly in apparatus using binary number representations one digital place is devoted to an indication of sign and, whether the number is positive or negative, the evaluation of the binary representation gives the number directly with its sign of which the binary representation might be said to be the coded form. If the digit in the allotted place (hereinafter referred to as the sign digit) is 0 then the number is a positive number; if the sign digit is 1, then the number is negative. The digital place selected for the expression of the sign is the highest place: thus if there are three available digital places the one on the left being highest the binary

011 represents a positive number by virtue of the presence of the 0 and this number is equal to 3 by virtue of the presence of unit digits in the $2^0$ and $2^1$ places. On the other hand the binary number

111 represents a negative number by virtue of the unit digit in the third place on the left and the number represented is −1 since according to the known convention a digit of value 1 in the highest available digital place is an indication that the next digital place of higher power should be assumed to be occupied by the digit −1. Thus the binary number $$111=-8+4+2+1=-1$$

In computing apparatus such as hitherto proposed for performing multiplication involving number representations coded according to this convention, the multiplication is effected as if all the digits, including the digit in the highest digital place of numbers involved be negative. Thus, some form of correcting programme is required, the programme being conditional on the value of the highest order digits. Such a programme usually involves a complementing operation after the multiplication has been completed.

However, when working according to the present invention with binary numbers according to $p$ digital places, use is made of the fact that a number expressed according to the above convention can be evaluated in accordance with the equation $$A=-a_p2^{p-1}+\sum_{r=1}^{p-1}a_r2^{r-1}$$

In the expression on the right hand side the coefficients $a_r$ are either 0 or 1. If $a_p$ is zero, then the number A is positive. If $a_p$ is unity then the number is negative. The binary representation of the number is $$a_p\ a_{p-1}\ a_{p-2}\ \ldots\ a_2\ a_1$$

and its evaluation is in accordance with the equation above. In other words, the weight attached to the digit in each place of the binary representation is normal and equal to $2^{r-1}$ if the plate is denoted by $r$, until the $p$th place is reached when the weight is $-2^{p-1}$, that is minus the normal weight.

According to the present invention, there is provided electrical computing apparatus for effecting multiplication, comprising a source of a group of signals representative of the numerical values of digits which yield a first number on evaluation with the digit of highest significance taken to be negative when different from zero and each other digit taken to be positive when different from zero, a source of a second group of signals representative of the numerical values of digits which on evaluation yield a second number with the digit of highest significance taken to be negative when different from zero and each other digit taken to be positive when different from zero, and a multiplying device for multiplying said signals to form the product of said numbers, said multiplying device including means for treating signals representative of the digit of highest significance in each number unconditionally as negative.

With computing apparatus according to the present invention different forms of apparatus for the multiplication of numbers coded according to the above convention are available. The forms may differ for example in respect to the way they deal with the partial products of multiplication in which a sign digit enters. Such partial products arise since the sign digits do not merely indicate sign but represent contributions that have to be taken into account numerically in evaluation. If the multiplication were performed on paper, then the negative digits in the partial products could be indicated by some suitable convention such as placing the minus sign in front of them or a bar above them and then when the summation of the partial products is effected the negative products could be treated appropriately bearing in mind their negative character. However, in a computing apparatus according to the above-mentioned forms of the invention all the partial products are dealt with initially as though they were positive, and means are provided for making a nondiscriminatory compensation to take into account the fact so that the final answer is the right one.

In one of the above-mentioned forms of the invention a negative digital product is represented by the inversion of its modulus, that is to say in a multiplication of two digits of which one is a sign digit, if the result of the multiplication is 1, the apparatus is arranged to represent the answer as 0 which, being the only alternative form of the sign digit, is referred to as its inversion. Similarly if the result of the multiplication is 0, the apparatus is arranged to represent the answer as the inversion of 0, namely 1. Moreover, in the multiplication of two digits both of which are sign digits, the apparatus is arranged to invert the answer twice, so that in effect the answer is unchanged. Thereafter in evaluating the answer of the completed multiplication, a standard correction is added, which as will hereinafter appear is unconditional with regard to numbers multiplied. The theory of the operation of this form of apparatus is indicated by the following mathematical analysis. If A and B are the two numbers to be multiplied then they are represented in the apparatus according to the form $$A=-a_p 2^{p-1}+\sum_{r=1}^{p-1} a_r{}^{r-1}$$

$$B=-b_p 2^{p-1}+\sum_{r=1}^{p-1} b_r 2^{r-1}$$

and the product A, B may be written according to $$A.B=\left(\sum_1^{p-1} a_r 2^{r-1}\right)\cdot\left(\sum_1^{p-1} b_r 2^{r-1}\right)-a_p 2^{p-1}\left(\sum_1^{p-1} b_r 2^{r-1}\right)-b_p 2^{p-1}\left(\sum_1^{p-1} a_r 2^{r-1}\right)+a_p\cdot b_p 2^{2p-2}$$

In the right hand side of this equation the first term is a system of positive digital products and the last term is a single positive digital product. These digital products are dealt with according to methods already known in the art. There remain two systems of negative digital products represented by the two negative terms. Any one of the terms $-\alpha_r$ in the first system of negative digital products is of form according to $$\alpha_r=a_p 2^{p-1}\cdot b_r 2^{r-1}$$

If $\sim\alpha_r$ represents the inversion of $\alpha_r$ then $$\alpha_r+\sim\alpha_r=2^{p+r-2}$$

Accordingly $$-\alpha_r=\sim\alpha_r-2^{p+r-2}$$

The sum of all the negative terms of the first system of partial products is therefore $$\sum_1^{p-1}-\alpha_r=\sum_1^{p-1}\sim\alpha_r-2^{p-1}\sum_1^{p-1}2^{r-1}$$

$$=\sum_1^{p-1}\sim\alpha_r-2^{p-1}(2^{p-1}-1)$$

the last bracket representing the summation of the geometric progression in 2 appearing in the previous line.

The sum of the first system of negative digital products is thus the sum of the inversions of the products together with a correction $$-2^{2p-2}+2^{p-1}$$

This correction may be written $$\tfrac{1}{2}(-2^{2p-1}+2^p)$$

The correction derived by treating the other system of digital products in the same way will be identical and accordingly the total correction to be applied is $$-2^{2p-1}+2^p$$

Using the further sign convention that a digit occupying the $2p$th place in a product is read as negative i. e. $-2^{2p-1}$ if it is other than zero the correction is $$2^{2p-1}+2^p$$

Moreover, the apparatus is arranged to suppress any digits of greater significance than the $2p$th digit. The mathematical theory may be illustrated by the following worked example (in which the symbol $\Delta$ is used to denote "digit"):

To calculate $(+2)\times(-4)$, i. e. $010\times100$, both (mod $2^3$). In the binary representation of the numbers, the digital significance increases from right to left.

— Place No. of $\Delta$

| | 6 | 5 | 4 | 3 | 2 | 1 |
|---|---|---|---|---|---|---|
| First part. prod. | | 0 | 1 | 1 | | |
| Second part. prod. | | | 0 | 0 | 0 | |
| Third part. prod. | | | | 1 | 0 | 0 |
| Sum of part. prods. | 0 | 1 | 0 | 0 | 0 | 0 |
| $2^{2p-1}$ | 1 | 0 | 0 | 0 | 0 | 0 |
| $2^p$ | 0 | 0 | 1 | 0 | 0 | 0 |
| Answer | 1 | 1 | 1 | 0 | 0 | 0 |

Answer 111000 (mod $2^6$) $=-32+16+8=-8$

The first partial product above is formed by multiplying the digit of greatest significance of the first binary number with each digit of the second binary number and inverting each elementary product if one (only) of the multiplied digits is a sign digit but not otherwise. This is in accordance with the rule specified above. Similarly, the second partial product above is formed by multiplying the digit of next greatest significance of the first binary number with the second binary number subject to the same proviso if one of the multiplied digits is a sign digit. The third partial product is formed in the same way. The partial products are then added in accordance with the normal rules of binary addition and the result is corrected by adding the standard correction of $2^{2p-1}+2^p$ as above described to yield the final answer. In this case, $p$ is 3 since we are dealing with three digit words initially.

In order that the said invention may be clearly understood and readily carried into effect, the same will now be more fully described with reference to the accompanying drawings, in which.

Figure 1:
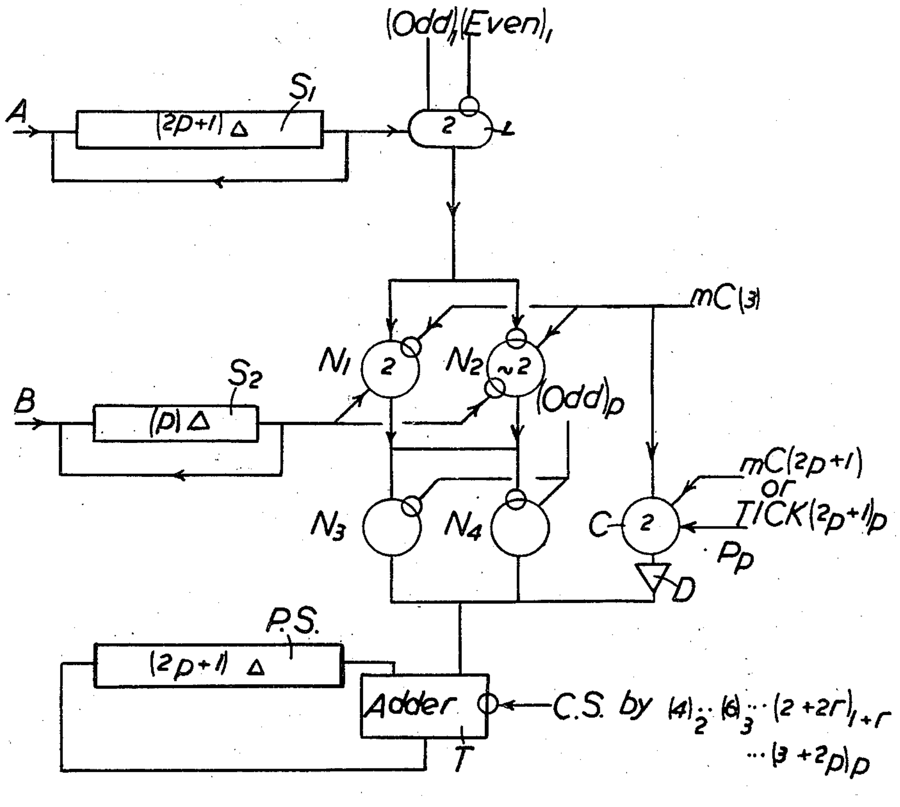
Figure 1 illustrates one example of computing apparatus in accordance with the above-mentioned form of the invention.

In the drawings the examples are illustrated by means of so-called logical circuits, in which conventional symbols for the logical elements are used. The symbols used are described in Chapter 8 of "Calculating Instruments and Machines" by D. R. Hartree, published by the University of Illinois Press.

The apparatus illustrated in Figure 1 is a modification of a known multiplying circuit and $N_1$ denotes a gate of threshold 2 with an inhibitor connection. Stores $S_1$ and $S_2$ of length $(2p+1)\Delta$ and $p\Delta$ and with feedback connections are provided as indicated for storing the multiplier A and multiplicand B, the numbers A and B being fed to the stores $S_1$ and $S_2$ as a train of pulses representative of the numbers coded in serial binary form and with word length $p\Delta$. The length of the stores $S_1$ and $S_2$ is defined as the time required for propagation of a pulse, representing a digit, from the input to the output of the respective store, the unit of time used in defining the length being the interval allotted to a digit. The stores $S_1$ and $S_2$ may be of any suitable known construction, there being a variety of known constructions. One suitable construction is described with reference to Figure 52, page 95, in "Calculating Instruments and Machines" above-mentioned. Similarly, the gate $N_1$ and each other gate in the circuit subsequently referred to may be of any suitable known construction. Suitable constructions of gates are described for example in United States Patent No. 2,192,122 to Bowman-Manifold et al. Figure 14. In the drawings, some of the gates enclose the figure 2 and this indicates that the gate has to be stimulated simultaneously from two input sources to cause it to deliver an output signal. Such a gate is said to be of threshold two. The absence of a figure in the symbol for a gate denotes a gate of threshold one, that is a gate which can be stimulated to produce an output signal by only a single input. An input lead to a gate which terminates in a small circle denotes an inhibitor connection, namely a connection such as to prevent the gate from delivering an output where an input is received from the inhibitor connection. Moreover, as will hereinafter appear, the timing of operations of the circuit is controlled by the pulse generator, or so-called clock, in well recognised manner, a suitable construction of clock being described in British Patent No. 614,220 to Scoles et al. As is well known in the art, the clock generates periodic pulses, the period of which is equal to the digit interval of the apparatus. Each group of $p$ pulses is referred to as a minor cycle, the time occupied by such a group of pulses being of course equal to that occupied by a train of pulses representing a number coded in serial binary form of word length $p\Delta$. The time of occurrence of a clock pulse is hereinafter referred to as a tick. In all the figures of the drawings, the legend associated with a lead to one of the circuit elements indicates that pulses are fed from the clock to the respective lead at the ticks denoted by the legend. The bracketed part of each such legend denotes the minor cycle number, counting from the time of initiation of the multiplication process, and the sub-scripts denote the tick number in the corresponding minor cycle, for example the legend $(ODD)_1$ denotes that a pulse is applied to the respective lead at the first tick in each odd-numbered minor cycle. Similarly, the legend $(2r+2)_{r+1}$ denotes that a pulse is applied to the respective lead at the $(r+)$th tick of minor cycle $2r+2$. Thus, a pulse is applied at the second tick of minor cycle 4 ($r=1$), a pulse is applied at the third tick of minor cycle 6 ($r=2$), and so on. The construction of a control organ for applying the clock pulses to the appropriate leads at the desired time is well known in the art and it forms by itself no part of the present invention.

Figure 4:
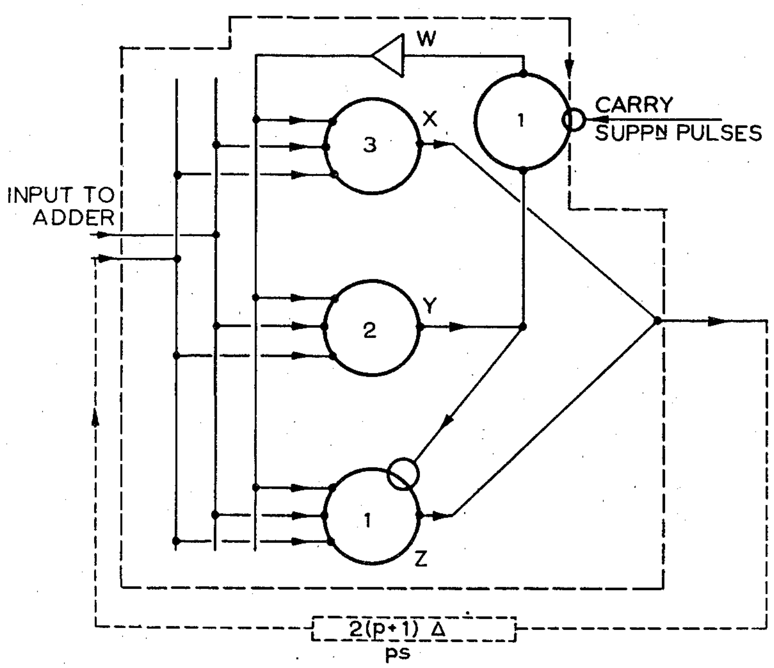
Figure 4 illustrates one example of a suitable adder circuit for use with computing apparatus according to the invention.

A gate $N_1$ is stimulated by the output of the B-store $S_2$ and by the output of a trigger circuit L of threshold 2 which is stimulated by the output of the A-store $S_1$ and by $(odd)_1$, that is clock pulses at the first tick of odd numbered minor cycles. The trigger circuit L may be of the well known Eccles-Jordan type, and the figure 2 enclosed by the symbol for the circuit L, which denotes the threshold of the circuit, indicates that when inputs are received simultaneously on the two left-hand leads to the trigger circuit, the trigger circuit is changed to one of its states of equilibrium, which state may, for convenience, be referred to as state 1. The lead to the trigger circuit L terminating in a small circle denotes an inhibitor connection which when pulses restores the trigger circuit to its other equilibrium state, say state 0. The gate $N_1$ is fed at its inhibitor connection with clock pulses during $m$C(3), that is minor cycle 3, as indicated, so that it is inhibited during that cycle, and it is associated with a second gate $N_2$ which has two inhibitor connections which receive the same pulses as the input connections of $N_1$ namely the output of the trigger circuit L and of the B-store $S_2$. The input of $N_2$ is stimulated with clock pulses during $m$C(3) and it functions as an inverting element yielding zero output except when it is stimulated during $m$C(3) and then its output is $\sim$(A.B) that is "not A and B." Thus, the gate $N_2$ allows the passage of each input pulse it receives during $m$C(3) unless it is inhibited by simultaneous input pulses from the store $S_2$. The gate $N_2$ may be realised in practice by a gate of threshold 1, with two inhibition terminals of joint inhibition threshold 2. The outputs of $N_1$ and $N_2$ are joined and fed to two further gates $N_3$ and $N_4$ each of which has threshold 1 and a single inhibitor connection. The joined outputs of $N_1$ and $N_2$ are fed to the input connection of $N_3$ and to the inhibitor connection of $N_4$, whilst the inhibitor connection of $N_3$ and the input connection of $N_4$ receive clock pulses at $(odd)_p$, that is the end ticks of each odd numbered minor cycle. The outputs of $N_3$ and $N_4$ are joined and fed to an adder circuit T which is associated with a product store PS of $(2P+1)\Delta$ delay. The adder circuit T may be of the construction shown in Figure 4, which form is due to von Neumann and is described in "Calculating Instruments and Machines" by D. R. Hartree in Chapter 8.5 and illustrated in logical form in Figure 61($a$), the product store being connected as shown in Figure 1 in a feedback loop from the output of the adder to one of the input connections. The adder T, employed in the invention, differs from that illustrated in "Calculating Instruments and Machines" only in that it has an inhibitor input connection which receives carry-suppression pulses in a manner to be described later.

The adder itself consists of three gates X, Y and Z, the gate X being of threshold 3, Y being of threshold 2 and Z of threshold 1 with an inhibitor connection. Each of the three input connections of gate X is connected to the corresponding input connections of the other gates Y and Z. One input connection is fed with the combined output of gates $N_3$ and $N_4$ as shown in Figure 1, the second is fed with the output from the product store PS and the third with carry pulses. The outputs of gates X and Z are joined and supply the input to PS. The output from gate Y supplies the carry pulses which are employed as described in "Calculating Instruments and Machines" except that they may be inhibited by the inhibitor input connection which has been already referred to and is denoted in Figure 4 by reference V. This connection receives inhibiting pulses at the ticks indicated by the associated legend in Figure 1. With a pulse on one of the input circuits of the three gates X, Y and Z, only the gate Z will pass a pulse, which is fed to PS. With two input pulses Y will pass a pulse which will inhibit Z, and if V is uninhibited will be fed to W and back to the third input circuit as a carry pulse. No pulse is fed to PS. With three input pulses X and Y are operated, Z is inhibited as before, a carry pulse is fed round to the input as before and a pulse is fed to PS from X.

The gates V, X, Y and Z may be of any known type suitable circuits being described in Electronics, September 1948, pages 110–118, or in the afore-mentioned United States Patent No. 2,192,122. The delay device W is of any suitable type, many types being known in the art.

When initiating operation of the circuit described, the series of pulses representing the number A is fed serially into the store $S_1$ during minor cycle 0, the digits being arranged in order of increasing power. During minor cycles 1 and 2, the pulses are propagated through the store $S_1$ and the length of the store is such that all but the highest power digit $a_p$ has passed from the store at its output end and returned, via the feedback path, to the input end of the store by the end of minor cycle 2. Therefore, at the first tick of minor cycle 3, the signal representing $a_p$ leaves store $S_1$ and is applied to the trigger circuit L. At the same tick, the trigger circuit L receives a clock pulse so that if the signal $a_p$ has the value one the trigger circuit L is changed to state one and remains in that state throughout minor cycle 3 but is restored to state zero at the first tick of minor cycle 4. Of course, if $a_p$ is value zero, the trigger circuit L receives only one input pulse at the first tick of minor cycle 3 and it remains in state zero. Throughout minor cycle 3, therefore, the trigger circuit is maintained in the state representing the digit $a_p$. Further circulation of the pulses round the loop comprising the store $S_1$ and its feedback path causes the next digit $a_{p-1}$ to be applied to the trigger circuit L at the first tick of minor cycle 5 and the trigger circuit is changed to state one if $a_{p-1}$ is unity but otherwise the trigger circuit remains in state zero. This procedure is repeated with successive digits in successive odd-numbered minor cycles, the group of pulses representing A circulating continuously round the loop including the store $S_1$. Therefore, the digits $a_p, a_{p-1}, \ldots a_1$ of the number A are set up successively by the trigger circuit L during successive odd numbered minor cycles commencing with $mC(3)$ in such a way that the digit $a_p$ is staticised by L during $mC(3)$, digit $a_{p-1}$ is staticised by L during $mC(5)$ and so on. Similarly, the series of pulses representing the number B is fed into the store $S_2$ during the minor cycle 0, the digits being arranged in order of increasing power, and as this store has a length $p\Delta$ the pulses complete one circulation around the loop formed by $a_2$ and its feedback path during each minor cycle. Thus, during each minor cycle after minor cycle 0, digits of B are applied successively to one lead of the gate $N_1$ and to the inhibitor connection of the gate $N_2$. During $mC(3)$, $N_1$ is inhibited but during subsequent minor cycles when the place of the digit of A staticized by L is denoted by $r=(p-1)$ to 1, $N_1$ and $N_3$ feed to the adder circuit T $$a_r \cdot \sum_{1}^{p-1} b_q$$

$a_r b_p$ being omitted since $N_3$ is inhibited during the last tick of each odd minor cycle. This result is achieved because during each minor cycle when trigger L is in a state representative of a digit of value 1 a pulse appears at the output of the gate $N_1$ each time the signal output from the multiplicand store $S_2$ is representative of a digit of value 1, except during the last tick (the $p$th tick) of each odd-numbered minor cycle when the gate $N_3$ is inhibited by a clock pulse. However, $\sim a_r b_p$ is fed to the adder circuit T via $N_1$ and $N_4$ during such last ticks since $N_4$ is then stimulated. When the $p$th digit of A is staticized by L, that is during $mC(3)$ when $N_1$ is inhibited, $N_2$ is stimulated so that the adder receives $$\sim\left(a_p \sum_{1}^{p-1} b_q\right) \text{ via } N_3 \qquad \text{and} \qquad \sim\sim(a_p b_p) = +a_p b_p$$

and $$\sim\sim(a_p b_p) = +a_p b_p \text{ via } N_4$$

This is so because $N_3$ is open and $N_4$ closed throughout $mC(3)$ except at the last tick, the situation being reversed at the last tick. In this way the required product is formed in the adder circuit T apart from the correction $2^{2p-1}+2^p$ which was referred to above, the product being accumulated in the product store PS as a $2p\Delta$ word in known manner. By virtue of the store PS having a length $(2p+1)\Delta$, the shift of one digit required as between successive partial products is automatically obtained as the digits circle the feedback loop through the store PS and return to the adder circuit T to be added to succeeding partial products. The correction is effected by feeding pulses to the adder when the pulse stream from $N_3$ and $N_4$ is zero, namely 1 digit after the end of $mC(3)$ during which $a_p$ is staticised by $L_1$ and 1 digit after the end of $mC\,(2p+1)$ during which $a_1$ is staticised by L. It will be appreciated that a pulse fed to the adder circuit T one digit after the end of $mC(3)$ will occupy the $2p$th place and represent $2^{2p-1}$ in the store PS, since the elementary product formed during the last tick of $mC(3)$ will occupy the $(2^{p-1})$th place since it represents $a_p b_p 2^{2p-2}$. Similarly, a pulse fed to the adder circuit T one digit after the end of $mC(2p+1)$ will represent $2^p$. This is done by a gate C of threshold 2 fed with pulses during $mC(3)$ from the same source as $N_1$ and $N_2$ and during $mC(2p+1)$, and also fed with a single pulse at the last tick of each minor cycle (denoted by $P_p$ in the drawing). Alternatively instead of applying pulses during the whole of $mC(2p+1)$, a single pulse at tick $(2p+1)_p$ will suffice. The output from C is fed to the adder T through a delay device D having a delay of 1 digit time. The delay device may be of any suitable construction, a wide variety of constructions being well known in the electronic art. Since a slow counter is required in time serial multiplication in any case, the special pulses required will be readily obtained. Hence the extra equipment required to form a multiplying circuit sensitive to sign is of the order of an adder circuit, i. e. 4 gates and a single delay device.

In unsigned multiplication, no carry suppression (C. S.) is required since the product of two $p(\Delta)$ words, that is words of $p$ digits, each less than $2^p$ is a $(2p)\Delta$ word less than $2^{2p}$. The latter part of this statement holds a fortiori in signed multiplication, but the addition of a correction pulse of weight $2^{2p-1}$ and $2^p$ means that the product may exceed $2^{2p}$, i. e. the product is less than $2^{2p+1}$ only, hence the multiplier can produce a $(2p+1)$th digit $2^{2p}$. This may be dealt with in various ways: i. e. by (I) suppressing it when withdrawing the product from the product store PS at the termination of the multiplication;

(II) postponing the problem by supplying the correction $2^{2p-1}+2^p$ at a later stage, when the normal C. S. of an adder may be used;

(III) using carry suppression at the adder of the circuit, by an advancing pulse at ticks $(2+2r)_{1+r}$, $r=1$ to $p$.

In the last method, it might be though that isolated C. S. pulses could be used, e. g. at the $2^{2p-1}$ tick following the formation of the first partial product. A simple example shows that this is not feasible:

if $$A=-2^{p-1}=B$$
$$a_r=b_r=0 \text{ for } r=1 \text{ to } (p-1)$$
$$a_p=b_p=1$$

then the first partial product $$=a_p 2^{p-1} \cdot b_p 2^{p-1} + \sim a_p 2^{p-1} \cdot \sum_{1}^{p-1} b_r 2^{r-1}$$
$$=2^{2p-2}+2^{p-1}(2^{p-1}-1)=2^{2p-1}-2^{p-1}$$

and since A. B.$=-2^{p-1}\cdot -2^{p-1}=2^{2p-2}$, it is clear that the unwanted digit in the $(ap+1)$th place may appear at any stage in the multiplication as successive partial products are added. Therefore, it is necessary to supply carry suppression pulses at the times indicated after addition of successive partial products.

Since the advancing C. S. pulse may be available from a slow counter and as this method allows the product store PS to serve as an accumulator, this method is indicated in the drawing, the adder T being shown to have an inhibitor connection which receives a pulse at $(2+2r)_{1+r}$ ticks.

In an alternative form of the invention digital products involving a sign digit are not dealt with by inversion but the negative digit representing the product is taken as its positive and the positive is repeated in all subsequent digits as far as and including the $2p$th place. The justification for this procedure is as follows. Any negative digit may be expressed as $-2^k$. This, however, may be written $$(-2+1)2^k$$
$$=-2^{k+1}+2^k$$

This shows that any negative digit may be replaced by its positive if a negative is placed in the next higher position. The process may be repeated until the $2p$th place is reached and then by sign convention $-2^{p-1}$ may be taken as $2^{2p-1}$ bearing in mind that the $2p$th place has to be evaluated negatively.

Figure 2:
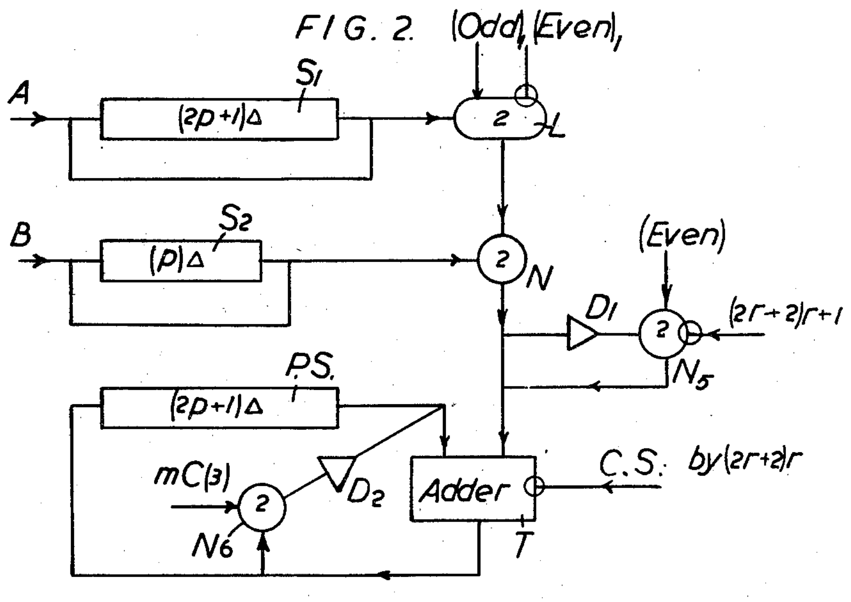
Figure 2 illustrates one example of another form of the present invention.

Figure 2 illustrates an example of a multiplying circuit which operates according to this alternative form of the invention, the circuit being essentially similar to that illustrated in Figure 1 and corresponding parts in Figures 1 and 2 being denoted by the same reference numerals. According to Figure 2, the partial products of A and B are admitted to the adder circuit T directly by a gate N of threshold 2 but a loop is provided as shown between the output of N and the input of the adder circuit T, the loop containing a delay element $D_1$ having a delay time of one digit and a gate $N_5$ of threshold 2 which receives one input from the delay element D and also receives clock pulses as indicated via a second input connection during even numbered minor cycles. The gate $N_5$ has an inhibitor connection which receives pulses at ticks $$(2r+2)_{r+1}$$

that is at the $(r+1)$th tick of $mC(2r+2)$, $r$ being obtained by equating $2r+2$ to the minor cycle number. The adder circuit T is included in a second loop in series with a gate $N_6$ of threshold 2 and with a delay element $D_2$ having a delay time of 1 digit. The gate $N_6$ has a second input connection which receives clock pulses during $mC(3)$, so that the gate passes out a pulse each time the adder passes out one during $mC(3)$ but is quiescent at other times, any pulse from the gate $N_6$ being returned to the adder through $D_2$ with a delay of one digit time.

In operation of the arrangement, successive digits of A, starting with the $p$th digit are staticised by the trigger circuit L during successive odd numbered minor cycles. Neglecting $mC(3)$ for the present, during $mC(5)$ and successive odd numbered minor cycles, the gate N forms the partial products $$a_r\sum_{1}^{p-1}b_q$$

for $$(r=(p-1) \text{ to } 1)$$

The highest order digit of each of these partial products is a sign digit and is repeated by the loop $D_1$ $N_5$ up to the $2p$th digital place. For example if the last digital product of minor cycle 5 is 1, representing $$\alpha_{p-1}2^{p-2}\cdot b_p 2^{p-1}=2^{2p-3}$$

the corresponding pulse, after delay by the element $D_1$ causes the gate $N_5$ to be opened at the first tick of $mC(6)$. However, during $mC(6)$, the timing of the inhibiting pulse fed to the inhibitor connection of $N_5$ is determined as indicated in the drawing by $(2r+2)_{r+1}$ where $2r+2$ is the minor cycle number. The inhibiting pulse thus occurs at tick 3 and thus the final digit, if 1, is repeated twice, namely in the $(2p-1)$th place and the $2p$th place with weights $2^{2p-2}$ and $2^{2p-1}$. Repetition occurs in a similar manner to the $2p$th place with the other partial products involving $b_p$ and lower order digits of A.

During $mC(3)$, the gate $N_6$ is opened by the first digit of value 1 fed to the adder, and that digit, and each digit of value 1 thereafter fed out of the adder, is repeated round the loop $N_6D_2$ as far as the $2p$th place, that is the first tick of $mC(4)$. The digital products in $mC(3)$ all involve $a_p$ and are therefore sign digits, whilst the last digital product involves both $a_p$ and $b_p$. However, the last digital product, if of value 1 representing $2^{2p-2}$, is also repeated into the $2p$th place by the loop $D_1N_5$ and this repeated digit added to that repeated by the loop $N_6D_2$ produces 0 in the $2p$th place which is the required result.

The circuit shown in Figure 2 has the disadvantage that the product store PS cannot be used as a general accumulator. This restriction can be resolved on noting that the largest partial product is $$a_pB\cdot 2^{p-1}=|a_pb_p2^{2p-2}|-\left|a_p\sum_{1}^{p-1}b_q2^{p+q-2}\right|=$$

$$a_pb_p2^{2p-1}-|a_pB2^{p-1}|, \text{ to modulus } 2^{2p}$$

Figure 3:
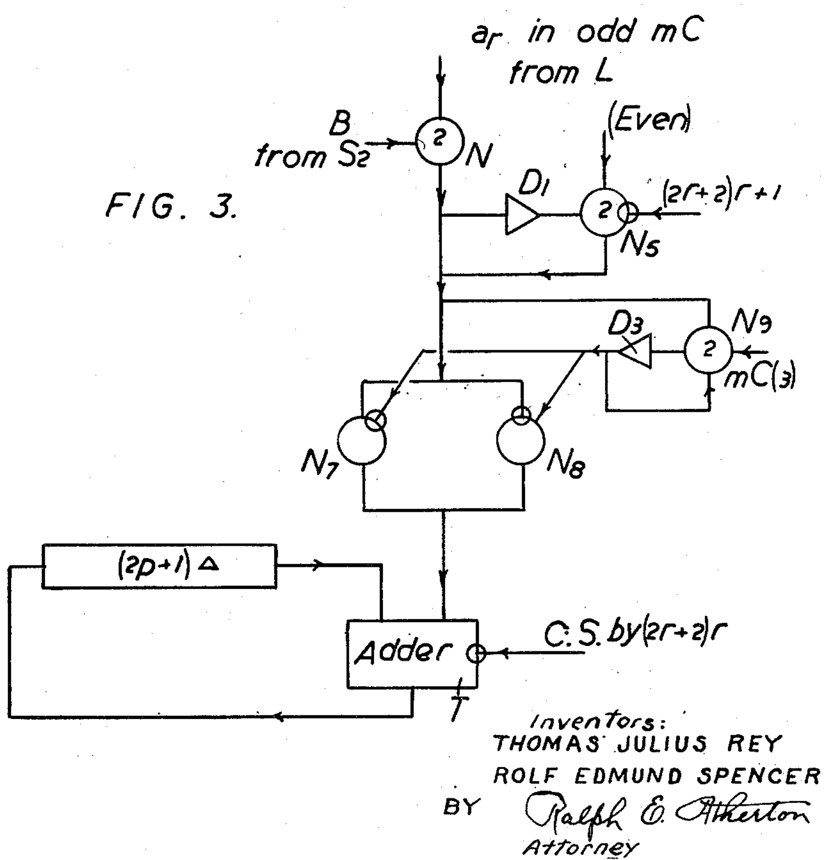
Figure 3 is a modification of Figure 2.

Figure 3 illustrates a modification of Figure 2 in which this result is applied and it will be observed that the loop including the adder T in Figure 2 is replaced by gates $N_7$ and $N_8$ both of which have inhibitor connections, the output of N and such repetitions as arise from the loop $D_1N_5$ being fed to the input connection of $N_7$ and to the inhibitor connection of $N_8$. The input to the inhibitor connection of $N_7$ and the input connection of $N_8$ is received from a gate $N_9$ of threshold 2 stimulated as shown with the same input as $N_7$, with clock pulses during $mC(3)$ and also from a feedback loop including a delay element $D_3$ of one digit time delay. With this arrangement $\alpha_pb_p2^{2p-1}$ is supplied to the adder by the loop $D_1N_5$ which as in Figure 2 copies the top digits of each partial product in the next minor cycle. In $mC(4)$, since $r$ is given by $2r+2=4$, $r$ is unity and therefore the inhibitor pulse applied to $N_5$ from the clock occurs at tick 2 and $\alpha_pb_p2^{2p-1}$ is set up by repeating the final elementary product in $mC(3)$, namely $\alpha_pb_p2^{2p-2}$, into the first place in $mC(4)$. The negative term of the last equation is formed by the elements $N_7$, $N_8$, $N_9$ and $D_3$ which constitute a complementing circuit, and function to complement the product $\alpha_pB$ as it emerges from N in $mC(3)$. The first pulse from the gate N during $mC(3)$ causes a pulse to be fed out of the gate $N_9$. This pulse, delayed by one digit interval in $D_3$, is returned to the third input connection of the gate $N_9$ which thereafter continues to feed out a pulse at each tick until the end of $mC(3)$. The train of pulses from $N_9$, delayed by $D_3$, inhibits the gate $N_7$ so that only the first pulse in the first partial product in the gate N passes to the adder via gate $N_7$. The train of pulses from $N_9$ is also applied to the input of $N_8$, when each such pulse is transmitted to the adder only if there is no pulse output at the same tick from N or from $D_1N_6$ during the first tick of $mC(4)$. Thus the first pulse, representing a binary one digit, from the gate N is passed to the adder and thereafter a pulse is fed to the adder at each digit time if there is no pulse output from the gate N, but at no other time, whereby the complement of $a_pB2^{p-1}$ is formed. It will be appreciated that if the sign digits of both the numbers A and B be of value 1 there will be a pulse from $N_5$ at the first tick of $mC(4)$ and also from $D_3$ both representing $2^{2p-1}$. However, the input to the adder is zero since both $N_7$ and $N_8$ are inhibited, producing 0 in the $2p$th place, which is the required result.

In the arrangements shown in Figures 2 and 3, no correction pulses are required but carry suppression is necessary in the adder T at ticks $(2r+2)_r$ and this is achieved by an inhibitor connection pulsed as indicated at the required ticks.

The invention is readily applicable to multiplication circuits wherein multiplier and product tanks are of integral word length, i. e. where a slow clock or an in-out unit delay operate on the multiplicand. The invention may also be applicable to the parallel mode of operation wherein all the digits of a partial product are formed at once, or nearly at once.

What we claim is:

1. Computing apparatus for effecting multiplication, comprising a source of a series of signals representing a first number, said signals having different values to represent a binary one digit and a binary zero digit respectively, said source including means to apply the signals therein successively to an output point, operation timing means, a two-state device having a binary one state and a binary zero state coupled to said output point and to said timing means to produce the binary state of said device corresponding to successive digits of said first number for successive time cycles, a second source of a series of signals representing a second number, said signals having different values to represent a binary one digit and a binary zero digit respectively, said second source including means to apply the full series of signals therein to another output point during each of said time cycles, an adding device, a normally blocked gated path from said latter output point to said adding device, and a coupling from said two-state device to said gated path normally to unblock said path in the binary one state of two-state device, whereby signals can pass to said adding device only during said time cycles representing partial products of said second number and successive digits of said first number, and correcting means connected to said timing means and to said gated path to inject other signals to said adding device in response only to binary one signals from said sources representing the digit of highest significance of the respective numbers, said correcting means being predetermined to cause the output of said adder to represent the signed product of said numbers, subject to the convention that the binary digit of highest significance of a number is negative when different from zero.

2. Computing apparatus for effecting multiplication, comprising a source of a series of signals having different values to represent a binary one digit and a binary zero digit respectively, said series of signals representing binary digits $a_p, a_{p-1} \ldots a_2, a_1$ of a first number A evaluated in accordance with the equation $$A=-a_p2^{p-1}+\sum_{r=1}^{p-1}a_r2^{r-1}$$

said source including means to apply signals therein successively to an output point, operation timing means, a two-state device having a binary one state and a binary zero state coupled to said output point and to said timing means to produce the binary state of said device corresponding to $$a_p, a_{p-1} \ldots a_2, a_1$$

respectively during successive time cycles, a second source of a series of signals having different values to represent a binary one digit and a binary zero digit, said latter series of signals representing binary digits $$b_p, b_{p-1} \ldots h_2, h_1$$

of a second number B evaluated in accordance with the equation $$B=-b_p2^{p-1}+\sum_{r=1}^{p-1}b_r2^{r-1}$$

said second source including means to apply the full series of signals therein to an output point during each time cycle, an adding device, a normally blocked gated path from said latter output point to said adding device, couplings from said two-state device and said timing means to said gated path to unblock said gated path in the binary one state of said two-state device for the time cycles corresponding to $$a_{p-1}, a_{p-2} \ldots a_2, a_1$$

gated means for feeding signals representing binary one digits to said adding device during the time cycle corresponding to $a_p$, couplings from said two-state device and said latter output point to said gated means to block said gated means in response to a binary one state of said device and a simultaneous binary one signal from said latter output point, signal inverting means coupled to said timing means for inverting the input to said adding device at times corresponding to $b_p$ in each time cycle, and means connected to said timing means for applying binary one signals to said adding device at times predetermined to represent $$2^{2p-1}+2^p$$

whereby the output of the adding device represents the product of A and B if the $2p$th digit is taken as negative when its value is different from zero.

3. Computing apparatus for effecting multiplication, comprising a source of a series of signals having different values to represent a binary one digit and a binary zero digit, said series of signals representing binary digits $$a_p, a_{p-1} \ldots a_2, a_1$$

of a first number A evaluated in accordance with the equation $$A=-a_p2^{p-1}+\sum_{r=1}^{p-1}a_r2^{r-1}$$

said first source including means to apply signals therein successively to an output point, operation timing means, a two-state device having a binary one state and a binary zero state coupled to said output point and to said timing means to produce the binary state of said device corresponding respectively to $$a_p, a_{p-1} \ldots a_2, a_1$$

during successive time cycles, a second source of a series of signals having different values to represent a binary one digit and a binary zero digit, said latter series of signals representing binary digits $$b_p, b_{p-1} \ldots b_2, b_1$$

of a second number B evaluated in accordance with the equation $$B=-b_p2^{p-1}+\sum_{r=1}^{p-1}b_r2^{r-1}$$

said second source including means to apply the full series of signals therein to an output point during each time cycle, an adding device, a normally blocked gated path from said latter output point to said adding device, a coupling from said two-state device to said gated path to unblock said gated path in the binary one state of said device, signal repeating means connected to said gated path for repeating the input to said adding device, and a coupling from said timing means to said repeating means to sensitize the repeating means during the time cycle corresponding to $a_p$, and at times corresponding to $b_p$ during the other time cycles, said repeating means being prearranged to repeat binary one signals up to digit positions correspond to $$2^{2p-1}$$

whereby the output of said adding device represents the product of A and B if the $2p$th digit of said output is taken as negative when its value is different from zero.

4. Electrical computing apparatus for effecting multiplication, comprising a source of a group of signals representative of the numerical values of digits which yield a first number on evaluation with the digit of highest significance taken to be negative when non-zero and the other digits taken to be positive when non-zero, a source of a second group of signals representative of the numerical values of digits which on evaluation yield a second number with the digit of highest significance taken to be negative when non-zero and the other digits taken to be positive when non-zero, gating means for producing a series of signals representative of the digital products of said numbers other than products involving one and only one of the digits of highest significance of said numbers, means for producing other digital signals in response to combinations of signals representing the digit of highest significance of each number and each digit other than that of highest significance of the other number, said other digital signals representing numbers differing from the digital products of the respective digits, and adding means for summing said digital product signals and said other digital signals, said other digital signals being predetermined to cause the output signals from said adding means to represent the product of said numbers when the digit of highest significance of the output is taken to be negative when non-zero and the other digits are taken to be positive when non-zero.

References Cited in the file of this patent

UNITED STATES PATENTS 2,686,632 Wilkinson ............... Aug. 17, 1954

OTHER REFERENCES

"Theory and Techniques for Design of Electronic Digital Computers," Moore School, University of Pa., Nov. 1, 1947, volume IV, pp. 47–9, 47–10, 47–11, 47–12, 47–14.

"A Functional Description of the Edvac," Moore School, University of Pa., Nov. 1, 1949, vol. I, pp. 4–18 to 4–24; volume II, Figure 1D4–3LD–2.

"Calculating Instruments and Machines," D. R. Hartree, University of Illinois Press, 1949, Chapter 8.

Report on a Conference on High Speed Automatic Calculating Machines, University Mathematical Laboratory, Cambridge, Jan. 1950; pages 41 to 47 (including Figs. 1 and 2).

Arithmetic perations in a Binary Computer, R. F. Shaw, the Review of Scientific Instruments, volume 21, No. 8. August 1950; pages 689 to 690.